US012170637B2

(12) United States Patent
Parmar (10) Patent No.: US 12,170,637 B2
(45) Date of Patent: Dec. 17, 2024

(54) CONFIGURABLE TRANSFER RATES OVER A TWO-WAY ETHERNET LINK

(71) Applicant: Marvell Asia Pte Ltd, Singapore (SG)

(72) Inventor: Harivaden Parmar, Wokingham (GB)

(73) Assignee: MARVELL ASIA PTE LTD, Singapore (SG)

( * ) Notice: Subject to any disclaimer, the term of this patent is extended or adjusted under 35 U.S.C. 154(b) by 246 days.

(21) Appl. No.: 17/691,141

(22) Filed: Mar. 10, 2022

(65) Prior Publication Data

US 2022/0294599 A1    Sep. 15, 2022

Related U.S. Application Data

(60) Provisional application No. 63/159,343, filed on Mar. 10, 2021.

(51) Int. Cl.
*H04L 5/14* (2006.01)
*H04L 67/00* (2022.01)
*H04L 67/12* (2022.01)

(52) U.S. Cl.
CPC ............... *H04L 5/14* (2013.01); *H04L 67/12* (2013.01); *H04L 67/34* (2013.01)

(58) Field of Classification Search
CPC ............ H04L 5/14; H04L 67/12; H04L 67/34
See application file for complete search history.

(56) References Cited

U.S. PATENT DOCUMENTS

| RE31,253 E | 5/1983 | Weinstein |
| 4,481,622 A | 11/1984 | Cheng et al. |
| 4,535,206 A | 8/1985 | Falconer |
| 5,393,701 A | 2/1995 | Ko et al. |

(Continued)

FOREIGN PATENT DOCUMENTS

| CN | 105763292 A | 7/2016 |
| EP | 2568652 A1 | 3/2013 |

(Continued)

OTHER PUBLICATIONS

EP Application # 22161387.0 Search Report dated Jul. 29, 2022.

(Continued)

*Primary Examiner* — Bailor C Hsu (57) ABSTRACT

An apparatus for data communication includes a sensor-transceiver and control logic. The sensor-transceiver is coupled to a sensor and connects by an Ethernet link of a communication network in a vehicle to a processor-transceiver that is coupled to a processor. In an upstream direction from the sensor-transceiver to the processor-transceiver, the sensor-transceiver transmits data to the processor-transceiver over the Ethernet link at an upstream data rate, and in a downstream direction from the processor-transceiver to the sensor-transceiver, receives data from the processor-transceiver over the Ethernet link at a downstream data rate. The control logic is configured to select the upstream data rate for communication in the upstream direction to be higher than the downstream data rate for communication in the downstream direction when operating in a first mode, and to select the upstream data rate to be lower than the downstream data rate when operating in a second mode.

20 Claims, 3 Drawing Sheets

(56) References Cited

U.S. PATENT DOCUMENTS

| | | | |
|---|---|---|---|
| 5,691,234 | A | 11/1997 | Su et al. |
| 5,702,566 | A | 12/1997 | Tsui |
| 6,101,172 | A | 8/2000 | Van Bavel et al. |
| 6,246,716 | B1 | 6/2001 | Schneider |
| 6,566,716 | B2 | 5/2003 | Lin et al. |
| 6,732,190 | B1 | 5/2004 | Williams et al. |
| 6,809,582 | B2 | 10/2004 | Morimoto et al. |
| 6,845,125 | B2 | 1/2005 | Sasaki et al. |
| 8,156,359 | B1 | 4/2012 | Sedarat et al. |
| 8,179,910 | B2 | 5/2012 | Diab et al. |
| 8,803,238 | B2 | 8/2014 | Kim |
| 8,948,203 | B1 | 2/2015 | Nolan et al. |
| 9,001,872 | B1 | 4/2015 | Farjadrad et al. |
| 9,426,164 | B2 * | 8/2016 | Otsuka ............... H04L 63/123 |
| 9,466,158 | B2 * | 10/2016 | Elnajjar ............... G07C 5/12 |
| 9,577,708 | B1 | 2/2017 | McClellan et al. |
| 9,767,626 | B2 * | 9/2017 | Makke ............... B60T 17/222 |
| 9,868,418 | B2 * | 1/2018 | Weinfurther ........ B60R 25/1001 |
| 9,893,756 | B1 | 2/2018 | Sedarat et al. |
| 10,069,521 | B1 | 9/2018 | Farjadrad et al. |
| 10,181,713 | B2 | 1/2019 | Bousquet et al. |
| 10,249,621 | B2 | 4/2019 | Visokay et al. |
| 10,256,941 | B1 | 4/2019 | Lo |
| 10,305,532 | B1 | 5/2019 | Jantzi et al. |
| 10,367,889 | B2 * | 7/2019 | Sangameswaran ..... H04L 12/18 |
| 10,530,559 | B2 | 1/2020 | Wu |
| 10,581,739 | B2 * | 3/2020 | Park ............... H04L 45/7452 |
| 10,999,124 | B1 | 5/2021 | Sedarat et al. |
| 11,121,083 | B2 | 9/2021 | Huang |
| 11,153,063 | B2 | 10/2021 | Wu et al. |
| 11,228,340 | B1 | 1/2022 | Lim et al. |
| 11,296,904 | B1 | 4/2022 | Benyamin et al. |
| 11,557,360 | B1 | 1/2023 | Lin et al. |
| 2003/0016770 | A1 | 1/2003 | Trans et al. |
| 2004/0091038 | A1 | 5/2004 | Agazzi et al. |
| 2007/0104124 | A1 | 5/2007 | Lee et al. |
| 2007/0153731 | A1 | 7/2007 | Fine |
| 2008/0049818 | A1 | 2/2008 | Taich et al. |
| 2009/0097392 | A1 | 4/2009 | Diab et al. |
| 2009/0154455 | A1 | 6/2009 | Diab |
| 2009/0154467 | A1 | 6/2009 | Diab |
| 2009/0154473 | A1 | 6/2009 | Diab et al. |
| 2009/0154593 | A1 | 6/2009 | Diab et al. |
| 2009/0158069 | A1 | 6/2009 | Oh |
| 2009/0201976 | A1 | 8/2009 | Shrikhande et al. |
| 2009/0256674 | A1 | 10/2009 | Lee et al. |
| 2010/0046543 | A1 | 2/2010 | Parnaby |
| 2010/0104056 | A1 | 4/2010 | Taich et al. |
| 2011/0103275 | A1 | 5/2011 | Rhelimi |
| 2011/0191656 | A1 | 8/2011 | Bliss et al. |
| 2012/0002662 | A1 | 1/2012 | Wan et al. |
| 2012/0327818 | A1 | 12/2012 | Takatori |
| 2013/0107765 | A1 | 5/2013 | He |
| 2013/0189932 | A1 | 7/2013 | Shen et al. |
| 2013/0257674 | A1 | 10/2013 | Li et al. |
| 2014/0011460 | A1 | 1/2014 | Ali et al. |
| 2014/0269353 | A1 | 9/2014 | Yang et al. |
| 2015/0256221 | A1 | 9/2015 | Rao et al. |
| 2015/0381777 | A1 | 12/2015 | Dalmia |
| 2016/0075325 | A1 * | 3/2016 | Kim ............... B62D 15/0285 |
| | | | 701/23 |
| 2016/0219458 | A1 | 7/2016 | Kubota et al. |
| 2017/0153644 | A1 * | 6/2017 | Otsuka ............... G08G 1/165 |
| 2018/0062514 | A1 | 3/2018 | Dong et al. |
| 2018/0183561 | A1 | 6/2018 | Dogiamis et al. |
| 2018/0309538 | A1 | 10/2018 | Verma et al. |
| 2019/0074257 | A1 | 3/2019 | Pritchard et al. |
| 2019/0082385 | A1 | 3/2019 | Shellhammer et al. |
| 2019/0128936 | A1 | 5/2019 | Brown |
| 2019/0140730 | A1 | 5/2019 | Oteri et al. |
| 2019/0313406 | A1 | 10/2019 | Liu et al. |
| 2019/0369709 | A1 | 12/2019 | Mayer et al. |
| 2020/0007017 | A1 * | 1/2020 | Hair ............... H02K 11/26 |
| 2020/0288396 | A1 | 9/2020 | Park et al. |
| 2020/0403824 | A1 | 12/2020 | Benyamin et al. |
| 2021/0067193 | A1 | 3/2021 | Dai et al. |
| 2021/0243001 | A1 | 8/2021 | Dalmia |
| 2022/0190875 | A1 | 6/2022 | Razavi Majomard et al. |
| 2023/0133507 | A1 | 5/2023 | Benyamin et al. |

FOREIGN PATENT DOCUMENTS

| | | |
|---|---|---|
| EP | 3166259 A1 | 5/2017 |
| WO | 2013122960 A1 | 8/2013 |
| WO | 2016190971 A1 | 12/2016 |

OTHER PUBLICATIONS

"How Much Does Office Building Wiring Cost?", CostOwl.com, pp. 1-3, Dec. 8, 2021, as downloaded from https://www.costowl.com/b2b/cabling-wiring/cabling-wiring-office-building-cost/.

CN Application # 202080029180.X Office Action dated Dec. 23, 2023.

U.S. Appl. No. 17/497,744 Office Action dated Apr. 7, 2023.

U.S. Appl. No. 17/963,463 Office Action dated Jun. 23, 2023.

IEEE Std 802.3cg-2019, "IEEE Standard for Ethernet—Amendment 5: Physical Layer Specifications and Management Parameters for 10 Mb/s Operation and Associated Power Delivery over a Single Balanced Pair of Conductors", pp. 1-256, Feb. 2020.

IEEE Std 802.3bw™—2015, "IEEE Standard for Ethernet—Amendment 1: Physical Layer Specifications and Management Parameters for 100 Mb/s Operation over a Single Balanced Twisted Pair Cable (100BASE-T1)," pp. 1-88, Mar. 2016.

IEEE Std 802.3bp-2016, "IEEE Standard for Ethernet—Amendment 4: Physical Layer Specifications and Management Parameters for 1 Gb/s Operation over a Single Twisted-Pair Copper Cable", pp. 1-211, Sep. 2016.

IEEE Std 802.3ch-2020, "IEEE Standard for Ethernet—Amendment 8: Physical Layer Specifications and Management Parameters for 2.5 Gb/s, 5 Gb/s and 10 Gb/s Automotive Electrical Ethernet," pp. 1-207, Jun. 2020.

U.S. Appl. No. 17/004,027 Office Action dated Mar. 25, 2022.

International Standard ISO/IEC11801, "Information Technology—Generic Cabling for Customer Premises," second edition, Sep. 2002, International Organization for Standardization, pp. 1-140, year 2004.

IEEE Std 802.3ae-2002, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Media Access Control (MAC) Parameters, Physical Layers, and Management Parameters for 10 Gb/s Operation," pp. 1-529, Aug. 30, 2002.

Barrass et al, "10GBASE-T: 10 Gigabit Ethernet over Twisted-Pair Copper," Ethernet Alliance, version 1.0, pp. 1-44, Aug. 2007.

Jones, "10GBASE-T Tutorial Overview," Institute for Electrical and Electronics Engineering, Interim, pp. 1-34, Jan. 2003.

Muller et al., "IEEE 802 10GBASE-T Tutorial—Overview," Institute for Electrical and Electronics Engineering, pp. 1-56, Nov. 2003.

Unberboeck, "10GBASE-T: 10Gbits/s Ethernet over Copper," Broadcom, pp. 1-23, Sep. 2006.

IEEE Std 802.3ak-2004, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer and Management Parameters for 10 Gb/s Operation, Type 10GBASE—CX4," pp. 1-56, Mar. 1, 2004.

IEEE Std 802.3an-2006, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer and Management Parameters for 10 Gb/s Operation, Type 10GBASE-T," pp. 1-181, Sep. 1, 2006.

(56) References Cited

OTHER PUBLICATIONS

Sedarat, "Optimized Asymmetric Operation—Technical Feasibility," Ethernovia, pp. 1-22, Jan. 16, 2020.
CN Application # 202080029180.X Office Action dated May 29, 2024.
Chen et al., "Low-Complexity Echo and NEXT Cancellers for High-Speed Ethernet Transceivers," IEEE Transactions on Circuits and Systems I: Regular Papers, vol. 55, issue 9, pages , Oct. 2008 (abstract).
CN Application # 202223355737.4 Board Opinion dated Jun. 18, 2024.

\* cited by examiner

CONFIGURABLE TRANSFER RATES OVER A TWO-WAY ETHERNET LINK

CROSS-REFERENCE TO RELATED APPLICATIONS

This application claims the benefit of U.S. Provisional Patent Application 63/159,343, filed Mar. 10, 2021, whose disclosure is incorporated herein by reference.

FIELD OF THE DISCLOSURE

The present disclosure relates generally to network communication, and particularly to methods and systems for supporting configurable data transfer rates over a two-way Ethernet link.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE Standard for Ethernet—Amendment 5: Physical Layer Specifications and Management Parameters for 10 Mb/s Operation and Associated Power Delivery over a Single Balanced Pair of Conductors," IEEE 802.3cg-2019, February, 2020; in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015, March, 2016; in "IEEE Standard for Ethernet Amendment 4: Physical Layer Specifications and Management Parameters for 1 Gb/s Operation over a Single Twisted-Pair Copper Cable," IEEE 802.3bp-2016, September, 2016; and in "IEEE Standard for Ethernet—Amendment 8:Physical Layer Specifications and Management Parameters for 2.5 Gb/s, 5 Gb/s, and 10 Gb/s Automotive Electrical Ethernet," IEEE 802.3ch-2020, June, 2020.

The description above is presented as a general overview of related art in this field and should not be construed as an admission that any of the information it contains constitutes prior art against the present patent application.

SUMMARY

An embodiment that is described herein provides an apparatus for data communication, including a sensor-transceiver, and control logic. The sensor-transceiver is configured to be coupled to a sensor and to connect by a full-duplex Ethernet link of a communication network in a vehicle to a processor-transceiver that is coupled to a processor. In an upstream direction from the sensor-transceiver to the processor-transceiver, the sensor-transceiver is configured to transmit data to the processor-transceiver over the Ethernet link at a selectable upstream data rate, and in a downstream direction from the processor-transceiver to the sensor-transceiver, to receive data from the processor-transceiver over the Ethernet link at a selectable downstream data rate. The control logic is configured to select the upstream data rate for communication in the upstream direction to be higher than the downstream data rate for communication in the downstream direction when operating in a first mode, and to select the upstream data rate to be lower than the downstream data rate when operating in a second mode.

In some embodiments, the upstream data rate and the downstream data rate are selectable from among multiple predefined data transfer rates. In other embodiments, the control logic is configured to modify at least one of the upstream data rate and the downstream data rate upon switching between the first mode and the second mode, and to allow communication with the processor-transceiver using the modified upstream and downstream data rates after verifying that the processor-transceiver has also switched to a same first mode or second mode as the sensor-transceiver. In yet other embodiments, in the first mode the sensor-transceiver sends sensor data to the processor via the processor-transceiver, and in the second mode the sensor-transceiver receives updated firmware or software from the processor, or from a storage device coupled to the processor, via the processor-transceiver.

In an embodiment, in the first mode, the control logic is configured to select the upstream data rate to correspond to a maximal data rate of the sensor data provided by the sensor. In another embodiment, the sensor-transceiver is configured to be coupled to one or more additional sensors, and the control logic is configured to select the upstream data rate to correspond to a sum of maximal data rates of sensor data provided respectively by the sensor and the one or more additional sensors. In yet another embodiment, the control logic is configured to communicate with the processor-transceiver messages that are indicative of the respective upstream data rate and the downstream data rate.

In some embodiments, in addition to the first and second modes, the sensor-transceiver is further configured to selectively operate in a high-data rate mode, in which both the upstream data rate and the downstream data rate are selected to be higher than a predefined data transfer rate. In other embodiments, in addition to the first and second modes, the sensor-transceiver is further configured to selectively operate in a low-data rate mode, in which both the upstream data rate and the downstream data rate are selected to be lower than a predefined data transfer rate. In yet other embodiments, the Ethernet link supports a maximal bidirectional rate, and the sensor-transceiver is configured to select the upstream data rate such that a sum of the upstream data rate and the downstream data rate corresponds to the maximal bidirectional rate.

There additionally provided, in accordance with an embodiment that is described herein, a method for data communication, including, in a sensor-transceiver coupled to a sensor and connected by a full-duplex Ethernet link of a communication network in a vehicle to a processor-transceiver that is coupled to a processor, in an upstream direction from the sensor-transceiver to the processor-transceiver, transmitting data to the processor-transceiver over the Ethernet link at a selectable upstream data rate, and in a downstream direction from the processor-transceiver to the sensor-transceiver, receiving data from the processor-transceiver over the Ethernet link at a selectable downstream data rate. The upstream data rate for communication in the upstream direction is selected to be higher than the downstream data rate for communication in the downstream direction when operating in a first mode. The upstream data rate is selected to be lower than the downstream data rate when operating in a second mode.

The present disclosure will be more fully understood from the following detailed description of the embodiments thereof, taken together with the drawings in which:

DETAILED DESCRIPTION OF EMBODIMENTS

Embodiments that are described herein provide improved Ethernet physical layer (PHY) transceivers and associated methods, for communication over full-duplex two-way channels. For example, these might be twisted-pair copper wire links in an automotive Ethernet network, or other suitable wired links having more than a single twisted pair in other suitable networks. The embodiments described herein refer mainly to asymmetric links, in which the transmission data rates differ between the two directions of the two-way link. Moreover, the data rates used in respective upstream and downstream directions are configurable, e.g., depending on an operational mode of the PHY transceivers.

The asymmetric PHY transceivers described herein are useful, for example, in automotive applications, e.g., systems that collect data from sensors within a vehicle and also control and configure the sensors. High resolution sensors may be used, for example, in Advanced Driver-Assistance Systems (ADAS) and in Autonomous Driving (AD) systems. The disclosed techniques are generally applicable, however, in various other applications that involve asymmetric links, for example in industrial and/or smart-home networks, as well as in video distribution systems. Certain aspects of bidirectional asymmetric Ethernet communication in such environments are addressed in U.S. Pat. No. 11,296,904, entitled "Asymmetric Energy Efficient Ethernet"; and in U.S. Pat. No. 11,153,063, entitled "Managing Bidirectional Communication in Constrained Environments" which are assigned to the assignee of the present patent application and whose disclosures are incorporated herein by reference. Aspects related to crosstalk in asymmetric link configurations are described, for example, in U.S. patent application Ser. No. 17/549,744, entitled "Network using Asymmetric Uplink and Downlink Baud Rates to Reduce Crosstalk" which is assigned to the assignee of the present patent application and whose disclosure is incorporated here by reference.

Consider a pair of Ethernet PHY transceivers that communicate with one another in full-duplex over a single twisted-pair link. In an automotive communication network, one PHY transceiver, referred to as a "sensor-transceiver," is coupled to one or more sensors of the vehicle, and the other PHY transceiver, referred to as a "processor-transceiver," is coupled to a processor in the vehicle, such as a central controller.

In an "upstream direction" from the sensor-transceiver to the processor-transceiver, the sensor-transceiver is configured to transmit data to the processor-transceiver over the Ethernet link at a selectable "upstream data rate," and in a "downstream direction" from the processor-transceiver to the sensor-transceiver, the sensor-transceiver is configured to receive data from the processor-transceiver over the Ethernet link at a selectable "downstream data rate." In the present context and in the claims, the term "data rate" refers to the amount of information (measured, e.g., in bits) transferred over a communication channel in a time unit.

It is noted that communication at a specified data rate means communication at a data rate not exceeding the specified data rate.

In a vehicular network example, the sensors may comprise various sensor types such as, for example, a video camera, radar sensors, lidar sensors, ultrasonic sensors, and the like. When the vehicle is operational for driving, the sensors typically send high-speed data, such as sensor data, to the processor in the upstream direction, and receive low-speed data, such as control and configuration data, from the processor in the downstream direction. In this setup, to utilize the link bandwidth efficiently, the PHY transceivers are configured to communicate using an upstream data rate that is higher than the downstream data rate.

A sensor in the vehicle typically comprises firmware and/or software that are updated occasionally. Such update is typically carried out when the vehicle is not operational for driving (e.g., in the garage). To update the firmware/software of a sensor, the processor downloads the updated firmware or software to the sensor, over the wired Ethernet link. The processor may acquire the updated firmware/software using, for example, "Software Over the Air" (SOTA) and/or "Firmware Over the Air" techniques. Alternatively, the updated firmware or software may be provided to the processor via a suitable dedicated data connection, e.g., when parked for service.

In principle, the PHY transceivers may support bandwidth allocation in which the upstream data rate is higher than the downstream data rate, e.g., as required when the vehicle is operational for driving. With such bandwidth allocation, however, the link is utilized inefficiently during firmware/software update, because the amount of data sent from the processor to the sensor (at the low downstream data rate) is typically much larger than that sent from the sensor to the processor (at the high upstream data rate). As a result, the download of undated firmware/software takes a long time, causing performance degradation in production and maintenance.

In the disclosed embodiments, the PHY transceivers support flexible bandwidth allocation in the upstream and downstream directions, which in some embodiments is selectable depending on an operational mode. With flexible bandwidth allocation between upstream and downstream directions, the link can be utilized efficiently in various use-cases.

In some embodiments, in the automotive environment, each PHY transceiver comprises control logic that configures the PHY transceiver to operate in a first mode (e.g., a field mode) or in a second mode (e.g., a diagnostics mode). When operating in the first mode, the control logic selects the upstream data rate to be higher than the downstream data rate. When operating in the second mode, the control logic selects the upstream data rate to be lower than the downstream data rate.

In an embodiment, the upstream data rate and the downstream data rate are selectable from among multiple predefined data transfer rates.

In some embodiments, the control logic of the sensor-transceiver modifies at least one of the upstream data rate and the downstream data rate upon switching between the first mode and the second mode, the control logic allows the sensor-transceiver to communicate with the processor-transceiver using the modified upstream and downstream data rates after verifying that the processor-transceiver has also switched to a same first mode or second mode as the sensor-transceiver. A phase of verifying that both PHYs are configured to a common operational mode before applying updated data rates is described, for example, in the method of FIG. 3 below.

In the first mode the sensor-transceiver sends sensor data to the processor via the processor-transceiver, and in the second mode the sensor-transceiver receives updated firmware or software from the processor, or from a storage device coupled to the processor, via the processor-transceiver.

Figure 1:
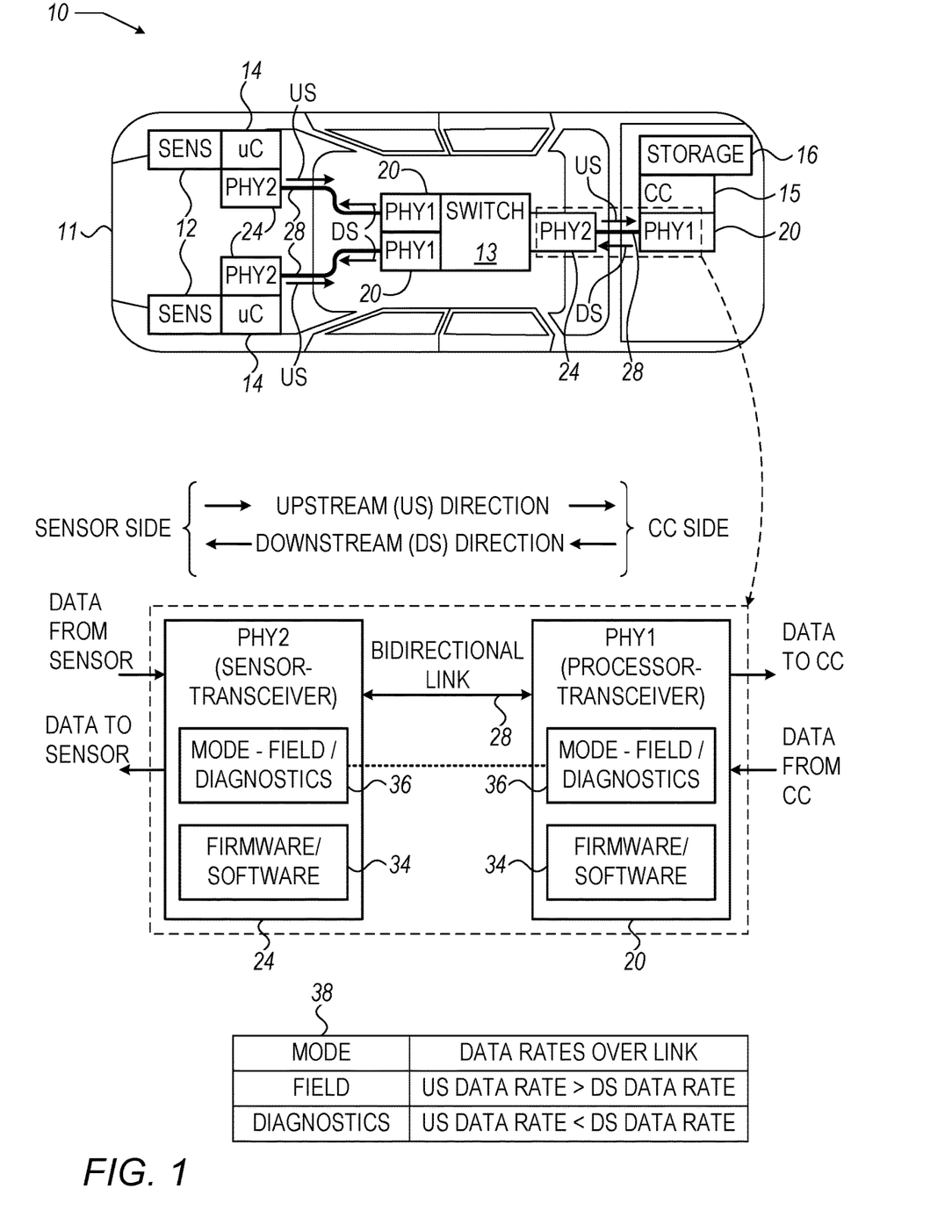
FIG. 1 is a block diagram that schematically illustrates an automotive communication system with configurable upstream and downstream data rates, in accordance with an embodiment that is described herein.

In the first mode, the control logic selects the upstream data rate correspond to a maximal data rate of the sensor data provided by the sensor. In an embodiment, such correspondence will select the upstream data rate to be the same as the maximal data rate of sensor data. In some embodiments, a sensor transceiver receives sensor data from multiple sensors having respective (possibly different) maximal sensor data rates. In the example of FIG. 1, PHY2 that is connected to switch 13, may concurrently receive sensor data from two sensors 12. When the sensor-transceiver receives sensor data from multiple sensors concurrently, the control logic selects the upstream data rate to correspond to a sum of maximal data rates of sensor data provided respectively by the multiple sensors, in an embodiment.

In some embodiments, in order to select the upstream and downstream data rates, the sensor-transceiver communicates with the processor-transceiver messages that are indicative of the respective upstream data rate and the downstream data rate.

In some embodiments, the PHY transceivers support more than two operational modes. For example, in addition to the first and second modes, the sensor-transceiver is further configured to selectively operate in a high-data rate mode, in which both the upstream data rate and the downstream data rate are selected to be higher than a predefined data transfer rate. Alternatively or additionally, in addition to the first and second modes, the sensor-transceiver is further configured to selectively operate in a low-data rate mode, in which both the upstream data rate and the downstream data rate are selected to be lower than a predefined data transfer rate.

In an embodiment, the Ethernet link supports a maximal bidirectional rate, and the sensor-transceiver is configured to select the upstream data rate such that a sum of the upstream data rate and the downstream data rate does not exceed the maximal bidirectional rate.

In the disclosed techniques, PHY transceivers communicating over a bidirectional Ethernet link support flexible bandwidth allocation between transmission directions based on an operational mode, which enables efficient link utilization in various use-cases. In an automotive environment, for example, using the disclosed embodiments enables to send updated firmware/software to the sensors at a downstream data rate higher than the upstream data rate.

FIG. 1 is a block diagram that schematically illustrates an automotive communication system 10, with configurable upstream and downstream data rates, in accordance with an embodiment that is described herein. Automotive communication system 10 is installed in a vehicle 11, and comprises multiple sensors 12, an Ethernet switch 13, multiple microcontrollers (μC) 14, a central controller (CC) 15 coupled to a storage device 16, multiple Ethernet physical layer (PHY) transceivers 20 of a first type (denoted PHY1), and multiple Ethernet PHY transceivers 24 of a second type (denoted PHY2).

In various embodiments, sensors 12 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like. Although only two sensors are seen for purposes of simplicity and clarity, a typical vehicle will include numerous sensors 12.

In the present example, each sensor 12 is connected to a respective microcontroller 14, which is in turn connected to a respective PHY transceiver 24 (PHY2). The PHY transceiver 24 of each sensor 12 is connected by a link 28 to a peer PHY transceiver 20 (PHY1) coupled to a port of Ethernet switch 13. On the sensor side of a given link, microcontroller 14 serves for example as a Medium Access Control (MAC) controller. On the switch side of a given link, MAC functions are carried out by suitable circuitry withing the Ethernet switch 13.

Automotive communication system 10 is an example use-case suitable for asymmetric Ethernet communication. Typically, sensors 12 generate large amounts of data that is sent to central computer (CC) 15 for analysis and/or display. In the opposite direction, the data typically comprises low-rate control and configuration data from CC 15 to sensors 12. In such a scenario, asymmetric communication provides better utilization of Ethernet links 28.

In the embodiment of FIG. 1, the direction from sensors 12 to central controller 15 (i.e., from PHY2 to PHY1) is referred to as an upstream direction (denoted US), whereas the direction from central controller 15 to sensors 12 (i.e., from PHY1 to PHY2) is referred to as a downstream direction (denoted DS).

In communication system 10, for a given pair of PHY transceivers comprising PHY1 and PHY2 coupled by a link 28, the PHY transceiver coupled closer to the sensors in a network path between a sensor and the processor, is also referred to herein as a "sensor-transceiver." In the given pair of PHY transceivers, the PHY transceiver coupled closer in the network path to the central controller is also referred to herein as a "processor-transceiver." In the embodiment of FIG. 1, PHY transceivers PHY1 serve as processor-transceivers, and PHY transceivers PHY2 serve as sensor-transceivers.

In the embodiment of FIG. 1, PHY transceivers 20 (PHY1) transmit at a data rate referred to as a "downstream data rate" and receive at a data rate referred to as an "upstream data rate." PHY transceivers 24 (PHY2) transmit at the upstream data rate and receive at the downstream data rate. Pairs of PHY transceivers 20 and 24 communicate with one another over twisted-pair copper links 28, which serve as full-duplex wire channels. As seen in the figure, the pairs of PHY transceivers 20 and 24 are arranged so that transmission from sensors 12 to CC 15 is performed in the upstream direction at the upstream data rate, and transmission from CC 15 to sensors 12 is performed in the downstream direction at the downstream data rate, in an embodiment.

In one embodiment, the upstream data rate is 10G bits per second (10 Gbps) in accordance with IEEE 802.3ch, and the downstream data rate is 100 Mbps in accordance with IEEE 802.3bw. In another embodiment, the upstream data rate is 10 Gbps in accordance with IEEE 802.3ch, and the downstream data rate is 10 Mbps in accordance with IEEE 802.3cg(10Base-T1s). In alternative embodiments, the downstream data rate and the upstream data rate may be chosen to be any other suitable bit rates. The link between PHY transceivers 20 and 24 may comprise any other two-way medium suitable for full-duplex communication.

The lower part of FIG. 1 depicts one pair of PHY transceivers PHY1 (20) and PHY2 (24) communicating with one another over link 28. In the selected pair, PHY1 is coupled directly to CC 15, and PHY2 is coupled indirectly to each of sensors 12 via a network path including Ethernet switch 13, another pair of PHY1 and PHY2 and microcontroller 14.

PHY transceivers 20 and 24 in communication system 10 comprise firmware and/or software 34 handling various tasks of the PHY transceiver. The firmware and/or software may need to be updated occasionally, e.g., for the purpose of upgrade, bug fixes or other maintenance tasks.

In the disclosed embodiments, for achieving high bandwidth utilization in various use-cases, PHY transceivers 20 and 24 support flexible data rate configuration in both the upstream and downstream directions. In some embodiments, the data rate configuration depends on an operational mode 36 of the PHY transceivers.

In communication system 10, PHY transceivers 20 and 24, may be configured to operate in a "field mode" in which the vehicle is operational for driving, or in a "diagnostics mode" in which the vehicle is subjected to diagnostics procedures, e.g., in production or maintenance, as described herein.

In the field mode, sensors 12 send high-speed data to CC 15, and receive low-speed data from CC 15, as described above. To utilize the link bandwidth efficiently, PHY1 and PHY2 allocate high bandwidth to the upstream direction and lower bandwidth to the downstream direction.

In the diagnostics mode, the vehicle is nonoperational for driving, and CC 15 downloads updated firmware or software (34) to sensors 12, in an embodiment. In order to minimize the download time, and since during firmware/software download the sensors send no data (or very little data) to the CC, PHY1 and PHY2 utilize the link bandwidth efficiently, by allocating high bandwidth to the downstream direction and lower bandwidth to the upstream direction.

Table 38 in the figure summarizes asymmetric data rate (or bandwidth) allocation in the field and diagnostics modes, in an embodiment. As seen in the table, in the field mode the upstream data rate is higher than the downstream data rate, and in the diagnostics mode, the upstream data rate is lower than the downstream data rate.

PHY transceivers 20 and 24 may allocate link bandwidth in various ways. In some embodiments, PHY1 and PHY2 allocate respective shares of the link bandwidth in the upstream and downstream directions, by assigning suitable respective time slots for upstream and downstream transmissions. For example, in the field mode, PHY1 and PHY2 assign shorter time slots in the downstream direction compared to the upstream direction. Methods for dividing bandwidth using time slots are described, for example, in U.S. patent application Ser. No. 16/815,299, entitled "Managing Bidirectional Communication in Constrained Environments" cited above.

Figure 2:
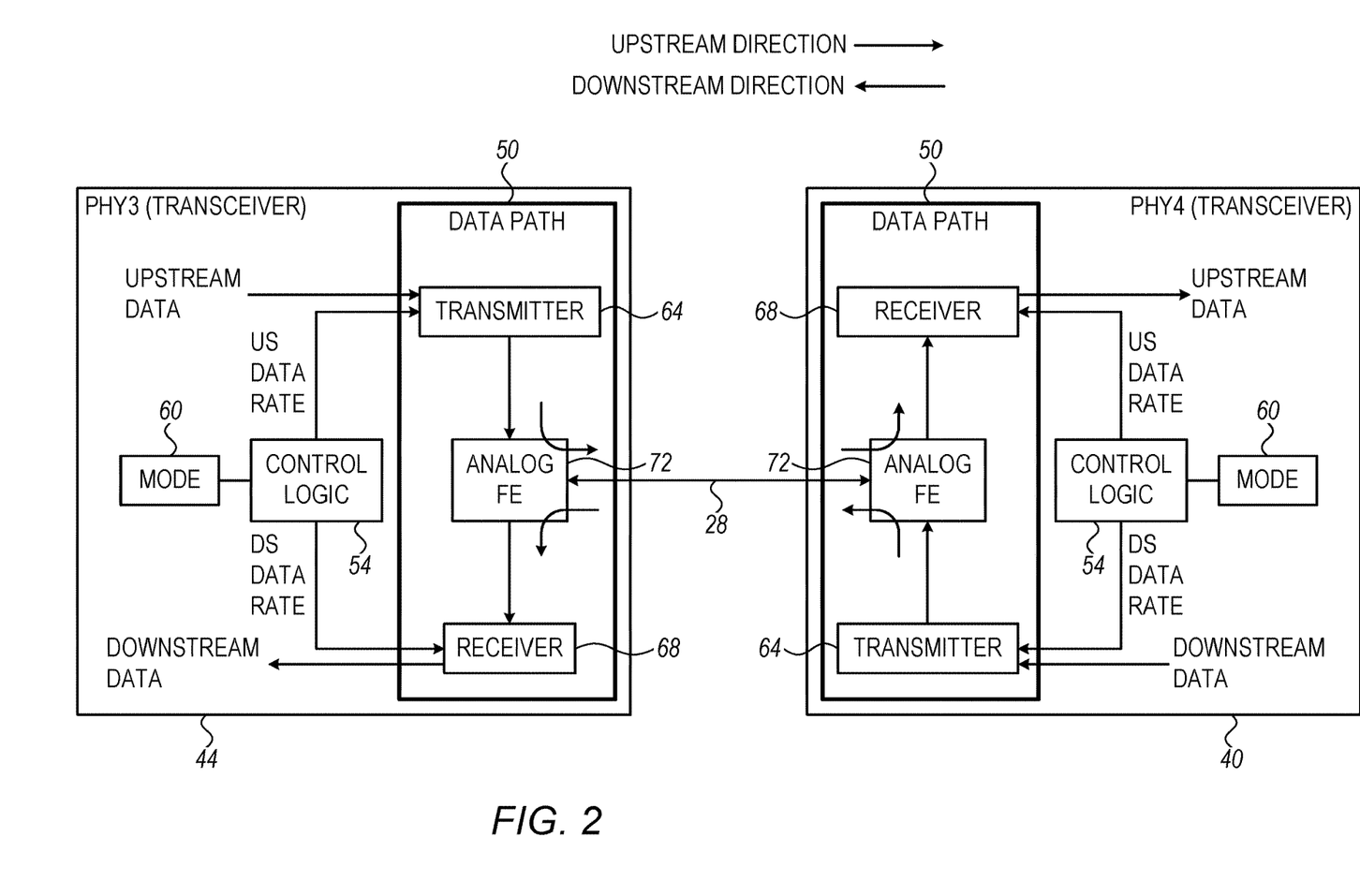
FIG. 2 is a block diagram that schematically illustrates a pair of Ethernet physical layer (PHY) transceivers communicating over a full-duplex two-way link, in accordance with an embodiment that is described herein.

FIG. 2 is a block diagram that schematically illustrates a pair of Ethernet physical layer (PHY) transceivers 40 and 44, communicating over a full-duplex two-way link 28, in accordance with an embodiment that is described herein. PHY3 of FIG. 2 may be used in implementing PHY2 of FIG. 1, and PHY4 of FIG. 2 may be used in implementing PHY1 of FIG. 1.

In some embodiments, PHY transceivers 40 44 communicate with one another using asymmetric bandwidth allocation. The term "asymmetric" in the present context means that the transmission data rates differ between the two directions of the two-way link. In the present example, PHY transceiver 44, denoted PHY3, transmits at the upstream data rate and receives at the downstream data rate. PHY transceiver 40, denoted PHY4, transmits at the downstream data rate and receives at the upstream data rate.

Each of PHY3 and PHY4 comprises a data path module 50 and control logic 54. Data path module 50 handles data transmission and reception to/from link 28. Control logic 54 performs control and configuration tasks of the PHY transceiver such as configuring the PHY transceiver in accordance with an operational mode 60, selecting upstream (US) and downstream (DS) data rates based on the operational mode, handling power-up and sleep/wakeup procedures, and the like.

Data path module 50, comprises a transmitter 64, a receiver 68 and an analog front end (FE) 72. The analog FE typically connects to link 28 using a suitable interface (not shown), e.g., a PHY Media-Dependent Interface (MDI). Analog FE 72 receives a digital signal from transmitter 64, converts the digital signal into an analog Ethernet signal and transmits the analog Ethernet signal over the link to the other PHY transceiver. The analog FE also receives an Ethernet analog signal carrying data sent by the other PHY transceiver over the link, converts the analog Ethernet signal into a digital signal and provides the digital signal to receiver 68 for recovering the data.

In the upstream direction, PHY3 transmits upstream data to PHY4 over the link, and in the downstream direction, PHY4 transmits downstream data to PHY3 over the link. Control logic modules 54 in PHY3 and PHY4 select upstream and downstream data rates based on operational mode 60. PHY3 configures its local transmitter to transmit at the upstream data rate, and its local receiver to receive at the downstream data rate. PHY4 configures its local transmitter to transmit at the downstream data rate, and its local receiver to receive at the upstream data rate.

Operational mode 60 is indicative of the upstream and downstream data rates required. For example, in a vehicle environment, operational mode 60 is configured to indicate that the upstream data rate is higher than the downstream data rate when operating in the field mode and is lower than the downstream data rate when operating in the diagnostics mode.

In some embodiments, operational mode 60 is switchable among multiple predefined operational modes. In an embodiment, in response to receiving a mode modification request specifying one of the predefined operational modes, the PHY transceiver switches to the requested operational mode. Control logic 54 in each of PHY3 and PHY4 verifies that the other PHY transceiver has also switched to the same operational mode, before applying the upstream and downstream data rates to its local transmitter and receiver.

When switching to a given operational mode, control logic 54 may select the upstream and downstream data rates in various ways. In one embodiment, control logic modules 54 of PHY3 and PHY4 negotiate respective upstream and downstream data rates with one another. In another embodiment, at least one of PH3 and PHY4 receive a message indicative of the upstream data rate and/or downstream data rate from an external processor (e.g., CC 15 of FIG. 1). In some embodiments, the upstream and downstream data rates are selectable over a predefined contiguous range of data rates. Alternatively, the upstream and downstream data rates are selectable from among multiple predefined data rates.

In one embodiment, PHY3 and PHY4 support only two predefined data rates denoted DR1 and DR2, wherein DR1 is higher than DR2. In this embodiment, the PHYs assign DR1 to the US direction and DR2 to the DS direction in the first mode (e.g., a field mode), and assign DR1 to the DS direction and DR2 to the US direction in the second mode (e.g., a diagnostics mode).

Figure 3:
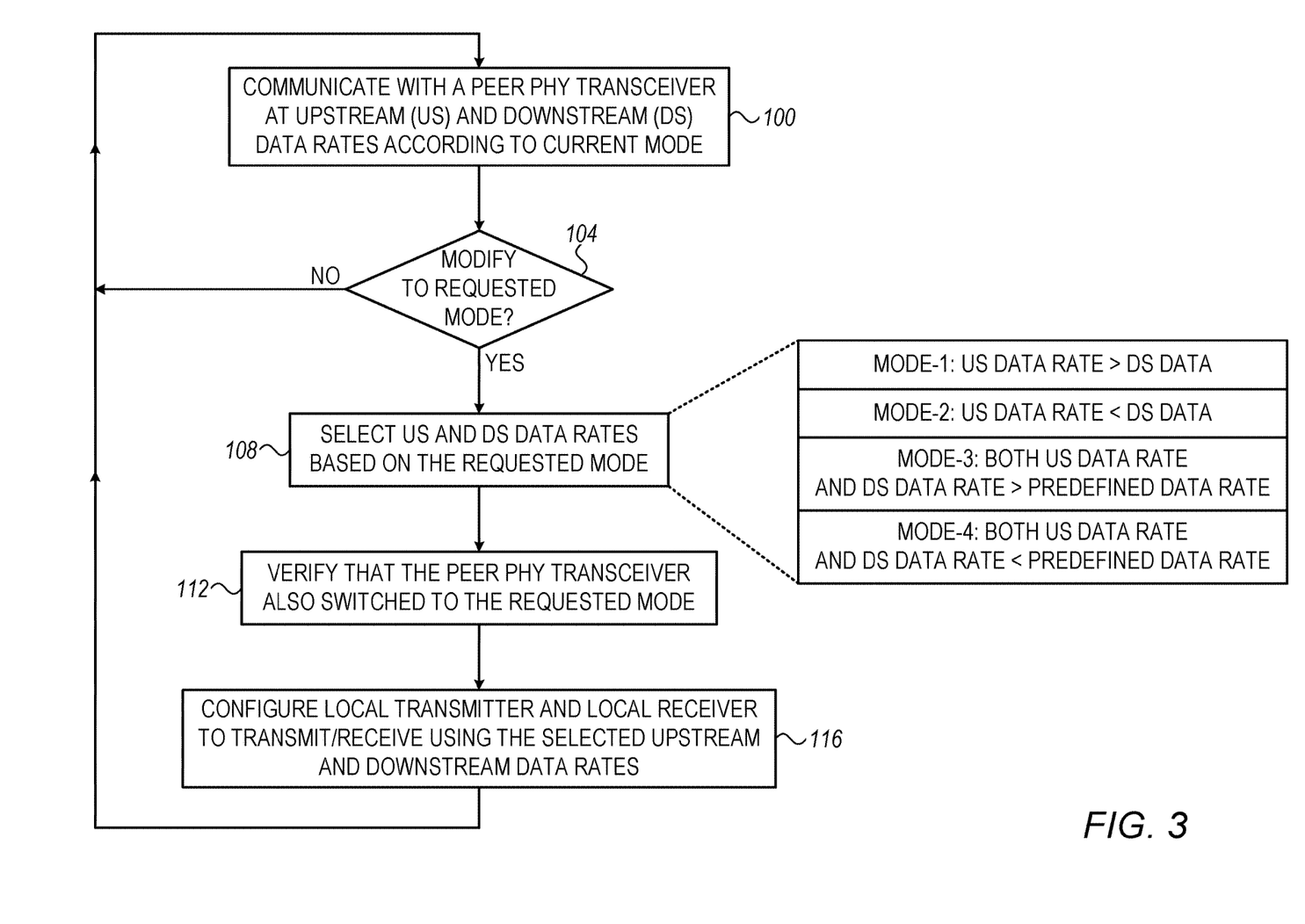
FIG. 3 is a flow chart that schematically illustrates a method for communication between a pair of Ethernet PHY transceivers over a bidirectional link, using selectable upstream and downstream data rates, in accordance with an embodiment that is described herein.

FIG. 3 is a flow chart that schematically illustrates a method for communication between a pair of Ethernet PHY transceivers over a bidirectional link, using selectable upstream and downstream data rates, in accordance with an embodiment that is described herein.

The method is described as executed by PHY transceivers PHY3 and PHY4 of FIG. 2 but is similarly applicable for a pair of PHY1 and PHY2 of FIG. 1. In describing the method, it is assumed that the upstream direction is from PHY3 to PHY4 and the downstream direction is from PHY4 to PHY3.

The method begins with PHY3 and PHY4 communicating with one another over bidirectional Ethernet link 28, at a communication operation 100. At operation 100, PHY3 and PHY4 operate in a previously selected current mode and communicate with one another over the link at upstream and downstream data rates in accordance with the current mode.

At a mode modification request operation 104, each of PHY3 and PHY4 independently checks whether it has received a request to modify its operational mode to a requested mode, and if not, loops back to operation 100 to communicate in the current mode.

When at operation 104, PHY3 (or PHY4) is requested to modify its mode, PHY3 (or PHY4) selects an upstream data rate and a downstream data rate in accordance with the requested mode, at a data rate selection operation 108. At a verification operation 112, PHY3 (or PHY4) checks whether the other PHY transceiver has also switched to the requested mode, e.g., by exchanging messages with the other PHY transceiver. Such verification is required so that switching to communication using the modified upstream and/or downstream data rates is done is a secure manner. At a data rate application operation 116, each of PHY3 and PHY4 configures its local transmitter and receiver to transmit/receive using the upstream and downstream data rates selected at operation 108, and loops back to operation 100 for communicating using the modified upstream and downstream data rates.

At operation 108 above, PHY3 and PHY4 may select upstream and downstream data rates depending on multiple predefined operational modes. For example, in an automotive Ethernet network, the PHY transceivers support a field mode and a diagnostics mode as described above with reference to FIG. 1.

In the example of FIG. 3, PHY3 and PHY4 support four predefined operational modes denoted MODE-1 . . . MODE-4, as summarized in Table 1. In this example, MODE-1 and MODE-2 are respectively similar to the field and diagnostics modes describe above with reference to FIG. 1. MODE-3 is a high data rate mode in which both the upstream and downstream data rates are higher than a predefined data rate. MODE-4 is a low data rate mode in which both the upstream and downstream data rates are lower than a predefined data rate.

TABLE 1

US and DS data rates depending on mode

| MODE | Upstream and downstream rates |
| --- | --- |
| MODE-1 | US data rate > DS data rate |
| MODE-2 | US data rate < DS data rate |
| MODE-3 | Both US data rate and DS data rate > predefined data transfer rate |
| MODE-4 | Both US data rate and DS data rate < predefined data transfer rate |

As an example use-case in which MODE-1 and MODE-2 may be used, consider a health-care setting in which in the US direction X-ray machine data (or data produced by other medical measurements) is sent for storage over an Ethernet link, and the DS direction data retrieved from the storage device is sent to a radiologist or a doctor over the same Ethernet link in the opposite direction. In MODE-1, medical data is sent in the US direction at a data rate higher than in the DS direction, whereas in MODE-2 data retrieved from storage is sent in the DS direction at a data rate higher than in the US direction.

As another example, consider a home or office setting, in which in the US direction streaming media is sent from a network cloud (of the streaming provider) to a consumer over an Ethernet link, and in the DS direction a user uploads media such as video clips to the network cloud over the same Ethernet link. In MODE-1 streaming media occurs at a high US data rate, and uploading to the cloud occurs at a low DS data rate. To support fast uploading, the PHY transceivers may switch to MODE-2, at least momentarily.

MODE-3 may be applicable, for example, in use-cases in which two or more computing platforms or communication hubs require maximum bandwidth in both directions, for exchanging large amounts of data with one another. Such a requirement may be relevant when the vehicle is in motion and the ADAS platform needs to exchange high-speed data, in both directions, with other computing platforms.

MODE-4 may be applicable, for example, in use-cases in which two or more computing platforms or computing hubs are triggered to save energy, e.g., by entering a low power consumption state. In the low-power state, the operating frequency of the CPU within the computing platform is reduced, as well as the bandwidths assigned for communication between the computing platforms.

The configurations of PHY transceivers 20, 24, 40 and 44 and their components, such as data path 50 and control logic 54, as shown in FIGS. 1 and 2, are example configurations that are depicted solely for the sake of clarity. In alternative embodiments, any other suitable configurations can be used.

The different elements of PHY transceivers 20, 24, 40 and 44 and their components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of PHY transceivers 20, 24, 40 and 44, e.g., functions of control logic 54, transmitter 64, receiver 68 and analog FE 72, may be implemented in software and/or using a combination of hardware and software elements. Elements that are not mandatory for understanding of the disclosed techniques have been omitted from the figure for the sake of clarity. For example, in some implementations, each PHY transceiver typically comprises a Media Dependent Interface (MDI) for coupling the transmitter and receiver to link 28.

Storage device 16 may comprise any suitable type of storage device, e.g., a volatile storage such as a Random Access Memory (RAM), a nonvolatile storage device such as a Flash device, or a combination of volatile and nonvolatile storage devices.

In some embodiments, some functions of PHY transceivers 20, 24, 40 and 44, e.g., functions of control logic 54 and data path 50, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address configurable upstream and downstream data rates in communicating with sensors in a vehicle network, the methods and systems described herein can also be used in other applications, such as in communication between two or more computing platforms or communication hubs.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet Physical Layer (PHY) transceiver, comprising:
   a data-path module, configured to be coupled to a sensor and to connect by a full-duplex Ethernet link of a communication network in a vehicle to a processor-transceiver that is coupled to a processor, wherein in an upstream direction to the processor-transceiver, the data-path module is configured to transmit data to the processor-transceiver over the Ethernet link at a selectable upstream data rate, and in a downstream direction from the processor-transceiver, to receive data from the processor-transceiver over the Ethernet link at a selectable downstream data rate; and
   control logic, configured to:
      when the Ethernet PHY transceiver is operating in a field-operation mode for operating while the vehicle is operational, select the upstream data rate to be higher than the downstream data rate;
      when the Ethernet PHY transceiver is operating in a diagnostic mode a diagnostics procedure, the diagnostic mode being different from the field-operation mode, select the upstream data rate to be lower than the downstream data rate; and
      configure the data-path module to operate at the selected upstream data rate and the selected downstream data rate.

2. The apparatus according to claim 1, wherein the upstream data rate and the downstream data rate are selectable from among multiple predefined data transfer rates.

3. The apparatus according to claim 1, wherein the control logic is configured to modify at least one of the upstream data rate and the downstream data rate upon switching between the field-operation mode and the diagnostics mode, and to allow communication with the processor-transceiver using the modified upstream and downstream data rates after verifying that the processor-transceiver has also switched to a same field-operation mode or diagnostics mode as the data-path module.

4. The apparatus according to claim 1, wherein in the field-operation mode the data-path module sends sensor data to the processor via the processor-transceiver, and wherein in the diagnostics mode the data-path module receives updated firmware or software from the processor, or from a storage device coupled to the processor, via the processor-transceiver.

5. The apparatus according to claim 1, wherein, in the field-operation mode, the control logic is configured to select the upstream data rate to correspond to a maximal data rate of the sensor data provided by the sensor.

6. The apparatus according to claim 1, wherein the data-path module is configured to be coupled to one or more additional sensors, and wherein the control logic is configured to select the upstream data rate to correspond to a sum of maximal data rates of sensor data provided respectively by the sensor and the one or more additional sensors.

7. The apparatus according to claim 1, wherein the control logic is configured to communicate with the processor-transceiver messages that are indicative of the respective upstream data rate and the downstream data rate.

8. The apparatus according to claim 1, wherein, in addition to the field-operation and diagnostics modes, the data-path module is further configured to selectively operate in a high-data-rate mode, in which both the upstream data rate and the downstream data rate are selected to be higher than a predefined data transfer rate.

9. The apparatus according to claim 1, wherein, in addition to the field-operation and diagnostics modes, the data-path module is further configured to selectively operate in a low-data-rate mode, in which both the upstream data rate and the downstream data rate are selected to be lower than a predefined data transfer rate.

10. The apparatus according to claim 1, wherein the Ethernet link supports a maximal bidirectional rate, and wherein the data-path module is configured to select the upstream data rate such that a sum of the upstream data rate and the downstream data rate corresponds to the maximal bidirectional rate.

11. A method for data communication, comprising:
   in a data-path module in an Ethernet Physical Layer (PHY) transceiver, the data-path module being coupled to a sensor and connected by a full-duplex Ethernet link of a communication network in a vehicle to a processor-transceiver that is coupled to a processor,
   in an upstream direction to the processor-transceiver, transmitting data to the processor-transceiver over the Ethernet link at a selectable upstream data rate, and in a downstream direction from the processor-transceiver, receiving data from the processor-transceiver over the Ethernet link at a selectable downstream data rate; and
   when the Ethernet PHY transceiver is operating in a field-operation mode for operating while the vehicle is operational, selecting the upstream data rate to be higher than the downstream data rate;
   when the Ethernet PHY transceiver is operating in a diagnostic mode for performing a diagnostics procedure, the diagnostic mode being different from the field-operation mode, selecting the upstream data rate to be lower than the downstream data rate; and configuring the data-path module to operate at the selected upstream data rate and the selected downstream data rate.

12. The method for data communication according to claim 11, wherein the upstream data rate and the downstream data rate are selectable from among multiple predefined data transfer rates.

13. The method for data communication according to claim 11, comprising modifying at least one of the upstream data rate and the downstream data rate upon switching between the field-operation mode and the diagnostics mode, and allowing communication with the processor-transceiver using the modified upstream and downstream data rates after verifying that the processor-transceiver has also switched to a same field-operation mode or diagnostics mode as the data-path module.

14. The method for data communication according to claim 11, wherein in the field-operation mode, transmitting data to the processor-transceiver comprises sending by the data-path module sensor data to the processor via the processor-transceiver, and wherein in the diagnostics mode, receiving data from the processor-transceiver comprises receiving by the data-path module updated firmware or software from the processor, or from a storage device coupled to the processor, via the processor-transceiver.

15. The method for data communication according to claim 11, wherein in the field-operation mode, selecting the upstream data rate comprises selecting the upstream data rate to correspond to a maximal data rate of the sensor data provided by the sensor.

16. The method for data communication according to claim 11, wherein the data-path module is coupled to one or more additional sensors, and wherein selecting the upstream data rate comprises selecting the upstream data rate to correspond to a sum of maximal data rates of sensor data provided respectively by the sensor and the one or more additional sensors.

17. The method for data communication according to claim 11, comprising communicating with the processor-transceiver messages that are indicative of the respective upstream data rate and the downstream data rate.

18. The method for data communication according to claim 11, comprising, in addition to the field-operation and diagnostics modes, selectively operating in a high-data-rate mode, in which both the upstream data rate and the downstream data rate are selected to be higher than a predefined data transfer rate.

19. The method for data communication according to claim 11, comprising, in addition to the field-operation and diagnostics modes, selectively operating in a low-data-rate mode, in which both the upstream data rate and the downstream data rate are selected to be lower than a predefined data transfer rate.

20. The method for data communication according to claim 11, wherein the Ethernet link supports a maximal bidirectional rate, and wherein selecting the upstream data rate comprises selecting the upstream data rate such that a sum of the upstream data rate and the downstream data rate corresponds to the maximal bidirectional rate.

\* \* \* \* \*